United States Patent [19]

Stacey et al.

[11] Patent Number: 5,762,407
[45] Date of Patent: Jun. 9, 1998

[54] BRAKE SYSTEM CONTROL METHOD AND APPARATUS

[75] Inventors: Scott Alan Stacey, Centerville; Deron Craig Littlejohn, Dayton, both of Ohio

[73] Assignee: General Motors Corporation, Detroit, Mich.

[21] Appl. No.: 818,841

[22] Filed: Mar. 14, 1997

[51] Int. Cl.$^6$ .................................................. B60T 13/74
[52] U.S. Cl. ........................ 303/155; 303/3; 303/113.4; 303/166; 303/DIG. 4
[58] Field of Search ....................... 303/155, 166, 303/3, 162, 115.2, 113.1, DIG. 3, DIG. 4, 113.4, 20; 188/156, 158, 162; 91/369.4, 369.1, 376 R, 369.2, 369.3; 701/79, 78; 60/545

[56] References Cited

U.S. PATENT DOCUMENTS

| | | | |
|---|---|---|---|
| 4,327,414 | 4/1982 | Klein | 303/155 |
| 4,395,883 | 8/1983 | Melinat | 60/545 |
| 5,207,770 | 5/1993 | Fecher | 91/369.04 |
| 5,427,442 | 6/1995 | Heibel | 303/113.4 |
| 5,539,641 | 7/1996 | Littlejohn | 364/426.01 |
| 5,586,814 | 12/1996 | Steiner et al. | 303/116.2 |
| 5,707,115 | 1/1998 | Bodie et al. | 303/3 |

*Primary Examiner*—Douglas C. Butler
*Attorney, Agent, or Firm*—Anthony Luke Simon

[57] ABSTRACT

A brake system control apparatus comprising: a sensor providing an output signal indicative of operator foot force on a brake pedal; an actuator coupled to wheel brake and controlling a wheel brake force applied by the wheel brake responsive to a control signal; a controller coupled to the sensor and the actuator and including a differentiator (60) receiving the output signal and determining a rate of change of the operator foot force on the brake pedal, a comparator (62) for comparing the rate of change to a predetermined minimum, wherein a rate of change above the predetermined minimum indicates a quick application of brake pedal force by the vehicle driver, a brake gain adjuster (64) for increasing a gain of the brake system when the rate of change is above the predetermined minimum, a brake command generator (72, 74) determining a control signal in response to the increased gain when the rate of change of brake force is above the predetermined minimum and responsive to a base gain when the rate of change of brake pedal force is not above the predetermined minimum, wherein, when a rate of change of brake force above the predetermined minimum is detected, the vehicle brake system has an effective gain higher than the base gain

4 Claims, 3 Drawing Sheets

BRAKE SYSTEM CONTROL METHOD AND APPARATUS

This invention relates to a brake system control method and apparatus.

BACKGROUND OF THE INVENTION

Motor vehicle brake systems generally operate by receiving brake pedal force from a driver's foot on the brake pedal and transferring that force into hydraulic force which actuates the hydraulic brake actuators of the wheel brakes. Many vehicles provide brake assist systems in which the force applied to the brake pedal by the driver's foot is amplified by a preset gain and the amplified force is transferred to the hydraulic brake system. The effect of this is to reduce the effort required by the driver to actuate the vehicle brakes.

In many systems there is a direct mechanical link between the brake pedal and the hydraulic system so that the force on the brake pedal is directly transferred to the hydraulic system. In other systems, such as described in U.S. Pat. No. 5,539,641, assigned to the assignee of this invention, the link between the brake pedal and the vehicle brakes is interrupted during normal operation and brake actuators are implemented to drive the brakes in a drive-by-wire configuration.

The above-mentioned patent, 5,539,641 illustrates an example brake system with drive-by wire operation for use in an electric vehicle that may perform both friction braking and regenerative braking. However, it is well understood that such drive-by wire brake systems are not limited to use in electric vehicles with regenerative braking and can be used to replace conventional braking in vehicles with conventional prime movers such as internal combustion engines.

It has been suggested to provide a brake system with a vacuum booster for providing the force gain from the brake pedal to the brake system controlled between first and second gains where a first gain is selected when a driver controlled switch is placed in a first position and a second gain is selected when a driver controlled switch is placed in the second position. This allows the driver to select between hard and soft braking.

SUMMARY OF THE INVENTION

It is an object of this invention to provide a brake system control method.

Advantageously, this invention provides a brake system control method for use in a vehicle with controllable brake system that allows for automatic selection of brake assist gain in response to driver input to the system.

Advantageously, this invention provides a brake system control that monitors the operator input to the brake pedal either directly or through sensors such as pressure sensors measuring master cylinder output pressure. The brake system control alters the gain or mechanical advantage of the brake system in response to the way the brake pedal is depressed. More particularly, the invention monitors the rate of change of brake pedal force and, when the rate of change of brake pedal force is above a predetermined magnitude, the force gain of the brake system is increased to provide an overall higher gain between the brake pedal and the wheel brakes. Thus an automatic switching from the normal brake operation to a "softer" brake pedal operation is achieved when sudden changes in brake pedal force are detected.

Advantageously in a preferred example, the change to the brake force gain is relational linearly to the rate of change of brake pedal force until a maximum gain is reached and then the maximum brake system force gain is maintained through the entire braking maneuver. When the brake pedal is depressed and the rate of change of brake pedal force is not greater than the predetermined minimum, then conventional brake operation is provided. When the brake gain has been increased because a brake pedal force rate was above the predetermined minimum, the brake gain does not return to its reset value until the brake pedal is released, thus maintaining the increased brake force gain through the entire braking maneuver.

More particularly, according to a preferred example, this invention provides a brake system control method comprising the steps of measuring a brake pedal force during a vehicle braking maneuver, determining a rate of change of the brake pedal force, comparing the rate of change to a predetermined minimum, when the rate of change is above the predetermined minimum indicating a quick application of brake force by the driver of the vehicle, increasing a gain in a brake controller, determining a brake actuator command in response to the increased gain when the rate of change of brake force is above the predetermined threshold, determining the brake actuator command responsive to a base gain when the rate of change of brake pedal force is not above the predetermined threshold and controlling an actuator responsive to the brake pedal force command wherein, when a rate of change of brake force above the predetermined threshold is detected, the vehicle brake system has an effective gain higher than the base gain when the rate of change of brake force is not above the threshold and wherein the higher gain is maintained until the vehicle brake pedal is released.

BRIEF DESCRIPTION OF THE DRAWINGS

The present invention will now be described by way of example with reference to the following drawings, in which.

DESCRIPTION OF THE PREFERRED EMBODIMENT

Figure 1:
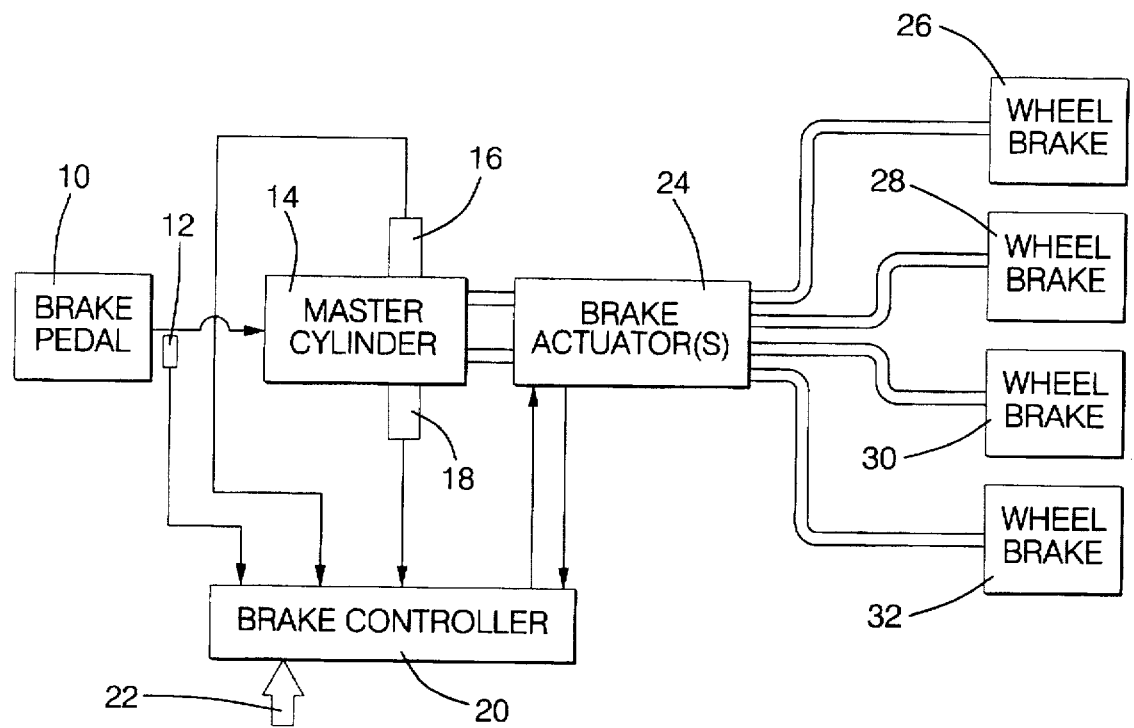
FIG. 1 illustrates schematically an example brake system according to this invention.

Referring now to FIG. 1, the schematic brake system shown includes brake pedal 10, master cylinder 14, brake actuators 24 and hydraulically actuated wheel brakes 26, 28, 30 and 32. Controller 20 is a brake controller of a known type having an internal microprocessor and conventional input and output circuits for interfacing with the various vehicle sensors and providing control commands to the brake actuators 24. A control routine is stored in the internal memory of the controller 20 that performs a series of predetermined control operations that provide the commands for actuators 24 in response to the brake pedal switch 12, the master cylinder pressure sensors 16 and 18 and other signals typically used by known brake controllers, such as wheel speed signals illustrated generally by arrow 22.

When a vehicle operator places his foot on the brake pedal to stop a motor vehicle, the brake pedal moves and the mechanical movement is input to the master cylinder 14, which transfers the mechanical energy to the hydraulic fluid in the brake system. The hydraulic fluid is provided from the master cylinder and through the various brake system hydraulic lines connecting the actuators 24 and the hydraulic wheel brake actuators 26, 28, 30 and 32. As described herein, the brake actuators 24 are generic and may be the brake actuator system shown in U.S. Pat. No. 5,539,641, which includes a motor driven reciprocating piston actuator. In general, the motor driven reciprocating piston actuator converts rotary motion of the actuator motors to linear motion of the pistons, controlling the volume of fluid in a piston cylinder. During brake actuation, a solenoid valve isolates the wheel brakes from the brake pedal and the actuators control brake pressure by varying the volume of fluid in the above mentioned actuator piston cylinders. Such motor driven reciprocating piston actuators are well known to those skilled in the art and need not be set forth herein in more detail. While the above-mentioned patent, 5,539,641, includes only front hydraulic brakes, it is understood the rear brakes may be implemented in the same manner as the front hydraulic brakes.

Alternatively, while FIG. 1 illustrates front and rear hydraulic brakes, it will be understood that this invention may be used with electrically driven brakes, for example, with two front hydraulic brakes and two rear electric brakes as provided in the above-mentioned patent 5,539,641. Further, it will be understood that this invention may be used in a vehicle with a conventional engine such as an internal combustion engine, to provide conventional or other brake by wire control and may be used in a vehicle such as shown in the above-mentioned U.S. Pat. No. 5,539,641 which includes an electric motor and drive unit and which also includes regenerative braking blended with the friction brake. It will also be understood by those skilled in the art that the brake actuators 24 may be solenoid type brake actuators that operate in a known manner to provide hydraulic fluid to the wheel brakes from a high pressure fluid source. For example, an accumulator receives the output of a hydraulic pump motor to controllably apply brake force when desired and solenoid valves release hydraulic fluid from the wheel brakes when it is desired to reduce brake pressure. Many examples of such solenoid-actuated brake control systems are well known to those skilled in the art. Further, any other type of brake actuator capable of affecting the force gain between the brake pedal input and the brake force applied to the individual wheel brakes may be used with this invention.

In general, the brake system operates as follows. When brake pedal 10 is depressed, brake switch 12, such as a known type used to illuminate rear mounted brake lamps in a conventional motor vehicle, provides a signal to the brake controller 20 indicating that the vehicle is in a braking maneuver. The master cylinder pressure sensors 16 measure the hydraulic pressure output of the master cylinder as an indication of driver requested braking force. The brake controller receives the information from the pressure sensors 16 and 18 and also the information from the wheel speed sensors (not shown) through lines 22 and determines a brake actuator command for the brake actuators 24 to transfer to the wheel brakes 26, 28, 30 and 32 the desired braking as indicated by the operator's depression of the brake pedal and measured by the pressure sensors 16 and 18. The result is the deceleration of the vehicle as requested by the driver.

In general, the brake pedal will provide a given feel to the operator which is indicative of the gain in brake force between the brake pedal and the wheel brakes that hydraulic actuators 24 provide responsive to the brake controller 20. For example, in a vehicle in which the brake pedal feels very soft, it is very easy to depress the pedal and stop the vehicle. This feel is commonly referred to as a "soft" feel and is indicative of a relatively high gain between the brake pedal and the wheel brakes. In vehicles where the brake pedal is somewhat firmer and more pedal force is required to provide the braking force for the vehicle, the feel is referred to as a "firm" brake pedal feel and is indicative of a gain between the brake pedal and the wheels less than the gain in the "soft" feel system. In general, the brake pedal feel, whether "firm" or "soft," is established by the vehicle brake system designer and the controller 20 controls the actuators 24 to achieve the desired feel in a known manner.

When the brake pedal is depressed, pressure sensors 16 and 18 measure the hydraulic pressure at the master cylinder output and the controller 20 monitors the rate that the hydraulic pressure increases. The controller 20 constantly compares the rate of hydraulic pressure increase to a predetermined threshold rate. When the rate of change of hydraulic pressure sensed by the sensors 16 and 18 is above the predetermined threshold, indicating rapidly increasing driver foot force on the brake pedal, the controller 20 controls the brake actuators 24 in a manner to increase assist provided by the actuators 24, changing the feel of the brake pedal from its standard designed feel to a softer feel to make the depression of the brake pedal and transfer brake force to the vehicle wheels easier.

Figure 2:
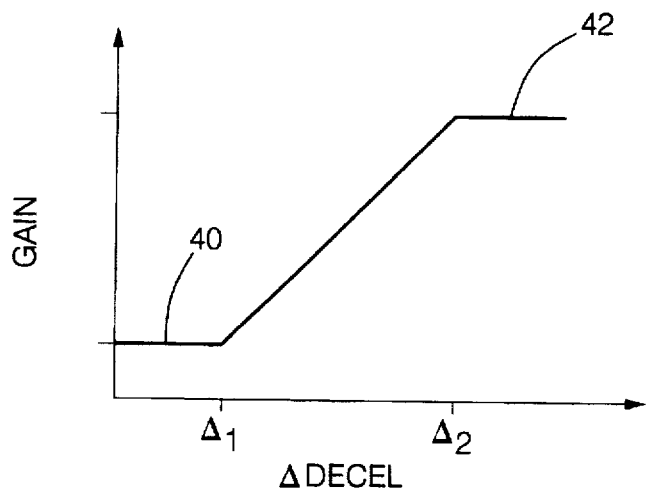
FIG. 2 illustrates a graph of an example variable brake gain according to this invention.

Referring now also to FIG. 2, the change in gain provided by the brake controller is illustrated by the graph. During normal vehicle operations, the brake gain is at the level designated by reference 40. When the rate of change of brake pedal force as indicated by the rate of change of hydraulic pressure output of the master cylinder is higher than a level designated $A_1$, then the brake gain is increased, in this example, linearly in relation to the rate of change of brake pedal force until a maximum brake gain 42 is reached at $A_2$. Once the gain is set to a predetermined value higher than its nominal value 40, the gain is not decreased or reset to its nominal value 40 until the braking maneuver that caused the increased gain is terminated. Thus, if the brake pedal force is characterized by a period with a high positive rate of change of force and then by periods of slower changing force, the braking during the periods of slower changing force will be at a gain as set during the period of the high rate of changing force. This is explained in more detail further below with reference to FIG. 4.

Figure 3:
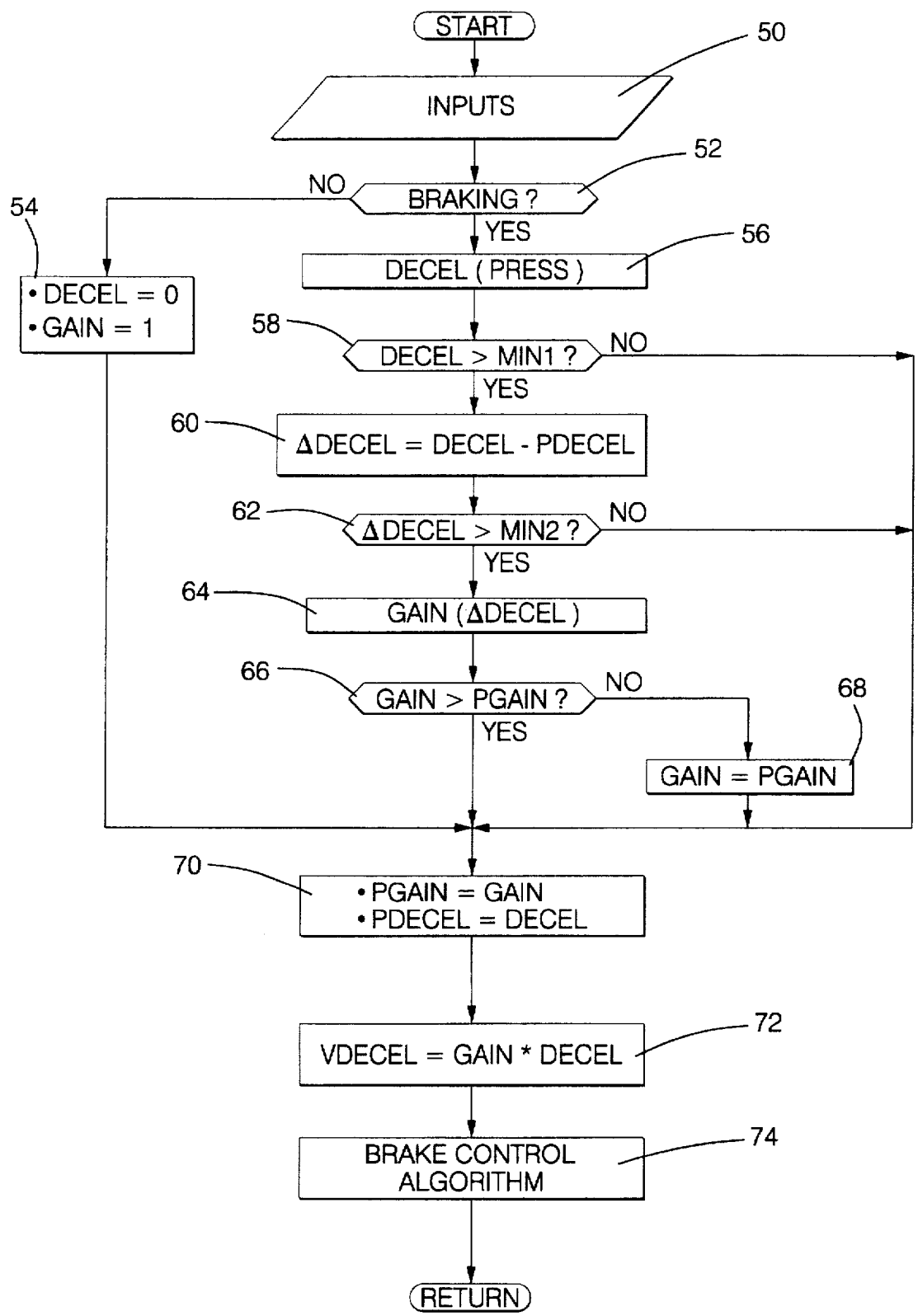
FIG. 3 illustrates schematically an example control command diagram for use by brake controller 20 according to this invention.

Referring now to FIG. 3, the flow diagram shown illustrates example steps by controller 20 for implementing the present invention. At step 50, the controller receives the various system inputs including the input from brake pedal switch 12, pressure sensors 16 and 18 and the various wheel speed sensors as indicated by line 22. Block 52 determines whether or not the vehicle is in a braking maneuver, for example, by checking the signal from the brake pedal switch 12. If the vehicle is not in a braking maneuver, then block 54 sets the DECEL command equal to zero and resets the brake gain, GAIN, to its base gain, in the present example set equal to 1.

If the vehicle is in a braking maneuver, the routine continues to block 56 where it determines a deceleration request, DECEL, as a function of hydraulic pressure at the master cylinder output, which indicates the amount of force applied on the brake pedal by the vehicle operator. This may be done by taking the maximum of the output signals from sensors 16 and 18 and providing that signal to a look-up table whose output multiplies a predetermined brake gain to the brake pedal force indicated by the maximum of the output signals from sensors 16 and 18.

Next, block 58 determines if DECEL is above a predetermined threshold value $MIN_1$. If DECEL is not above $MIN_1$, the routine continues to block 70 described below. If the deceleration request is above the predetermined value $MIN_1$, the routine continues to block 60 where it determines the rate that DECEL is increasing, representing the rate of increase in vehicle operator foot force to the brake pedal. More particularly, block 60 determines a value $\Delta$DECEL equal to DECEL minus PDECEL, where PDECEL is the DECEL command during the previous control loop. Then block 62 compares the value $\Delta$DECEL to a second threshold $MIN_2$. If $\Delta$DECEL is not above $MIN_2$, then the routine continues to block 70 described further below. If $\Delta$DECEL is above $MIN_2$ indicating a high rate of change of force applied to the brake pedal 10, then block 64 increases GAIN using a look-up table programmed with the function shown in FIG. 2 relating $\Delta$DECEL to GAIN.

From block 64, the routine continues to block 66 where it compares the GAIN determined at block 64 to PGAIN, which is set equal to the value of GAIN during the previous control loop. If GAIN is not greater than PGAIN, then the routine continues to block 68 where it resets the value GAIN equal to PGAIN. If at block 66 the GAIN determined at block 64 is greater than PGAIN, then the routine continues to block 70.

Block 70 updates PGAIN equal to GAIN and PDECEL equal to DECEL. From block 70, the routine continues to block 72 where it determines the vehicle deceleration request, VDECEL, as a product of GAIN and DECEL.

From block 72, the routine continues to block 74 where it implements a brake control algorithm of a known type that generates control commands for the vehicle brake actuators 24 to transfer a desired brake force necessary to decelerate the vehicle according to the vehicle deceleration request, VDECEL, to the wheel brakes 26, 28, 30 and 32. Such brake control algorithms are well known to those skilled in the art and may, for example, implement control functions set forth in the above-mentioned U.S. Pat. No. 5,539,641.

In addition to converting the command VDECEL to the appropriate brake actuator command, the brake control algorithm may perform one or more of the following functions and apply those functions in a known maimer as appropriate. The brake controller may perform anti-lock brake control in a known manner to detect and prevent incipient wheel lockup conditions during vehicle braking, may perform vehicle traction control in a known manner to detect and prevent incipient wheel spin by a drive wheel of the vehicle during positive acceleration of the vehicle, may provide selective activation of the wheel brakes 26, 28, 30 and 32 to provide yaw rate and related control functions and may provide modification to the command to the brake actuators to achieve a desired regenerative brake blending as is known to use in vehicles with regenerative braking capabilities. Examples of these control functions are known to those skilled in the art and because they are not central to this invention, need not be set forth herein in detail. It is noted that a brake command determined by an anti-lock brake control system and/or a yaw rate control system may take precedent over the brake command VDECEL to control the wheel brakes 26, 28, 30 and 32.

Figure 4:
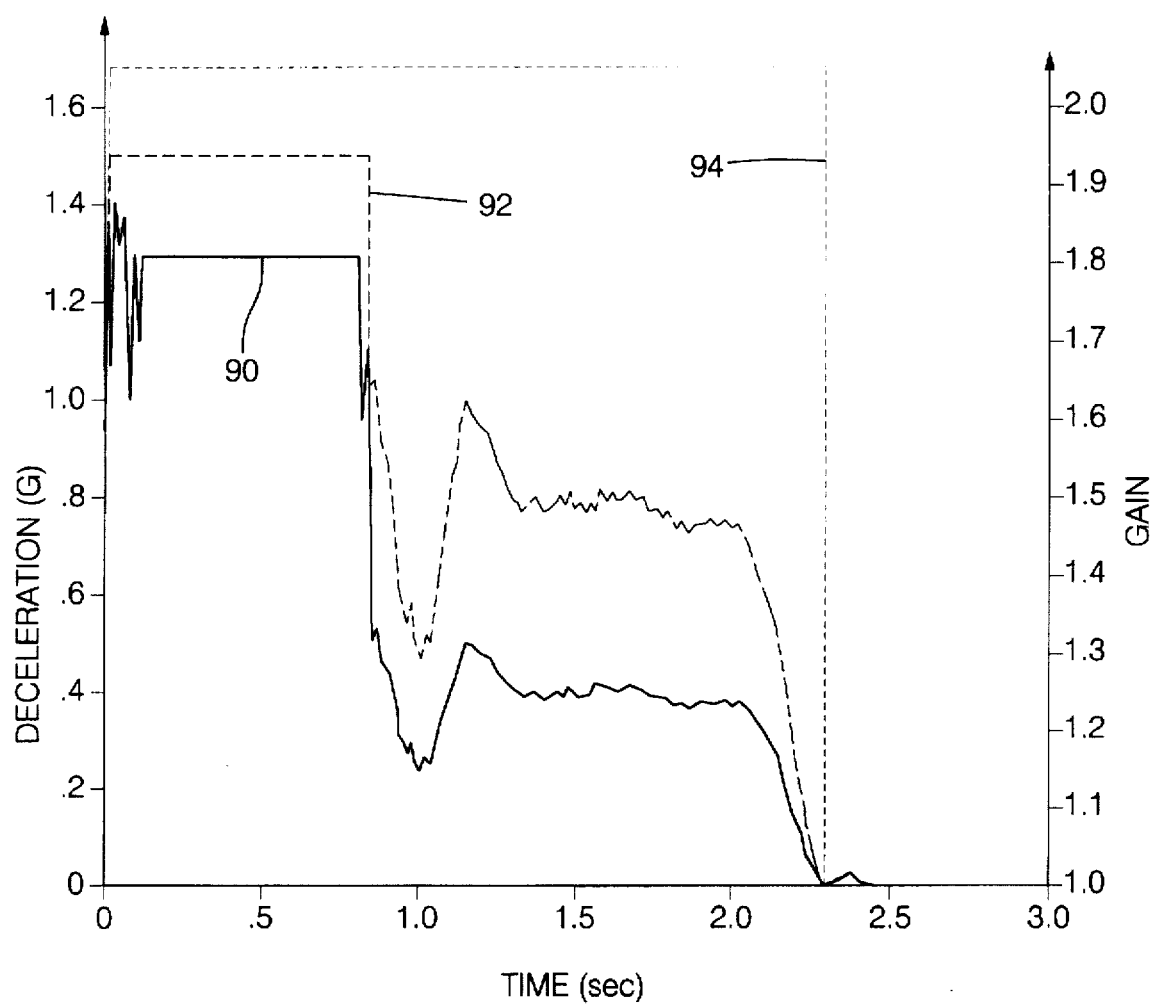
FIG. 4 illustrates an example advantageous operation according to this invention.

Referring now to FIG. 4, the graph shown illustrates an example operation of this invention. Trace 90 illustrates an example deceleration request that would be used to generate the brake force command for the vehicle wheel brakes during a brake maneuver by a conventional brake control and is characterized at the beginning by a sudden increase cause by a sudden apply of force to the brake pedal. Trace 94 illustrates the value GAIN implemented as described above in response to the brake pedal force inputs that generated deceleration request 90. As noted above, GAIN represents the gain between the vehicle operator's brake pedal force and the brake force output by the vehicle wheel brakes. As illustrated in the figure, when trace 90 first rises high due to a rapid increase in brake pedal force, the gain 94 increases to its maximum value and is maintained there until the brake pedal is released. Trace 92 illustrates the deceleration request generated by the brake system in response to the gain 94. Once the gain 94 increases above the default value, the deceleration request 92 generated using the gain 94 remains higher than the conventional deceleration request 90 through the remainder of the braking maneuver. Then, when the brake pedal is released, the deceleration request 92 follows the conventional deceleration request 90 until another sudden increase in brake pedal force is detected.

The example system described above with reference to FIG. 1 uses hydraulic pressure sensors detecting the hydraulic pressure output of the master cylinder to measure operator foot force on the brake pedal. Those skilled in the art will understand that other sensors capable of providing output signals indicative of operator foot force on the brake pedal include brake pedal travel sensors that measure the distance that the brake pedal is depressed and brake pedal force sensors that directly measure force on the brake pedal. In one example, this invention was implemented with a brake pedal travel sensor and a master cylinder output hydraulic pressure sensor. Each sensor was used to generate a deceleration request and the maximum of the deceleration requests generated was used to control the brakes in the manner described above.

We claim:

1. A brake system control method comprising the steps of:

measuring a brake pedal force during a vehicle braking maneuver;

determining a rate of change of the brake pedal force;

comparing the rate of change to a predetermined minimum, wherein a rate of change above the predetermined minimum indicates a quick application of brake pedal force by the vehicle driver;

when the rate of change is above the predetermined minimum, increasing a gain in a brake controller;

determining a brake actuator command in response to the increased gain when the rate of change of brake force is above the predetermined minimum;

determining the brake actuator command responsive to a base gain when the rate of change of brake pedal force is not above the predetermined minimum; and controlling an actuator responsive to the brake pedal force command wherein, when a rate of change of brake force above the predetermined minimum is detected, the vehicle brake system has an effective gain higher than the base gain when the rate of change of brake force is not above the minimum and wherein the higher gain is maintained until the vehicle brake pedal is released.

2. A brake system control method according to claim 1, wherein the brake pedal force is measured with a master cylinder pressure sensor.

3. A brake system control apparatus comprising:

a sensor providing an output signal indicative of operator foot force on a brake pedal;

an actuator coupled to wheel brake and controlling a wheel brake force applied by the wheel brake responsive to a control signal;

a controller coupled to the sensor and the actuator and including a differentiator (60) receiving the output signal and determining a rate of change of the operator foot force on the brake pedal, a comparator (62) for comparing the rate of change to a predetermined minimum, wherein a rate of change above the predetermined minimum indicates a quick application of brake pedal force by the vehicle driver, a brake gain adjuster (64) for increasing a gain of the brake system when the rate of change is above the predetermined minimum, a brake command generator (72, 74) determining a control signal in response to the increased gain when the rate of change of brake force is above the predetermined minimum and responsive to a base gain when the rate of change of brake pedal force is not above the predetermined minimum, wherein, when a rate of change of brake force above the predetermined minimum is detected, the vehicle brake system has an effective gain higher than the base gain.

4. A brake system control apparatus according to claim 3, wherein the higher gain is maintained until the vehicle brake pedal is released.

* * * * *